US009660243B2

(12) United States Patent
Nakayama et al.

(10) Patent No.: US 9,660,243 B2
(45) Date of Patent: May 23, 2017

(54) BATTERY WIRING MODULE

(75) Inventors: Osamu Nakayama, Mie (JP); Ryoya Okamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 688 days.

(21) Appl. No.: 14/114,966

(22) PCT Filed: Jun. 5, 2012

(86) PCT No.: PCT/JP2012/064437
§ 371 (c)(1),
(2), (4) Date: Oct. 31, 2013

(87) PCT Pub. No.: WO2013/011756
PCT Pub. Date: Jan. 24, 2013

(65) Prior Publication Data
US 2014/0080364 A1    Mar. 20, 2014

(30) Foreign Application Priority Data
Jul. 19, 2011   (JP) .................... 2011-157749

(51) Int. Cl.
H01M 10/48     (2006.01)
H01M 2/20      (2006.01)
H01M 2/10      (2006.01)

(52) U.S. Cl.
CPC ......... *H01M 2/206* (2013.01); *H01M 2/1077* (2013.01); *H01M 10/48* (2013.01)

(58) Field of Classification Search
CPC ........ H01M 2/20; H01M 2/202; H01M 2/206; H01M 10/48; H01M 10/482
See application file for complete search history.

(56) References Cited

U.S. PATENT DOCUMENTS 6,261,719 B1   7/2001   Ikeda et al.
6,275,003 B1   8/2001   Marukawa et al.
(Continued)

FOREIGN PATENT DOCUMENTS

JP   2000-149909   5/2000
JP   2001-057196   2/2001
(Continued)

OTHER PUBLICATIONS

Search report from E.P.O., mail date is Feb. 9, 2015.
Search report from International Search Report in PCT/JP2012/064437, mail date is Sep. 4, 2012.

*Primary Examiner* — Christina Chern
(74) *Attorney, Agent, or Firm* — Greenblum & Bernstein, P.L.C.

(57) ABSTRACT

A battery wiring module in which connection members are held by a resin protector, the connection members connecting adjacent electrode terminals of a plurality of single batteries, the single batteries having the positive and negative electrode terminals, as well as a battery-side detection terminal for detecting a status of the single battery. The battery wiring module includes a voltage detection terminal, which includes a flat plate-shaped flat plate and a wire connection connected to a terminal end of a wire. The resin protector includes an opening, which enables the battery-side detection terminal to contact the flat plate of the voltage detection terminal. The voltage detection terminal includes an engaged portion extending on a different plane than that of the flat plate. The engaged portion is engaged with a first engagement portion provided to the resin protector.

10 Claims, 12 Drawing Sheets

(56) References Cited

U.S. PATENT DOCUMENTS

| | | |
|---|---|---|
| 7,229,320 B2 | 6/2007 | Saito et al. |
| 8,492,024 B2 | 7/2013 | Ogasawara et al. |
| 2006/0183367 A1 | 8/2006 | Saito et al. |
| 2011/0064987 A1 | 3/2011 | Ogasawara et al. |

FOREIGN PATENT DOCUMENTS

| | | |
|---|---|---|
| JP | 2006-222043 | 8/2006 |
| JP | 2010-170884 | 8/2010 |
| JP | 2010-257944 | 11/2010 |
| JP | 2011-065863 | 3/2011 |
| JP | 2011-124176 | 6/2011 |
| JP | 2012-064455 | 3/2012 |

BATTERY WIRING MODULE

FIELD OF THE INVENTION

The present invention relates to a battery wiring module.

BACKGROUND OF THE INVENTION

A battery module for use in an electric automobile or hybrid car has a plurality of single batteries arrayed in lines, the single batteries having positive and negative electrode terminals. The plurality of single batteries are connected serially or in parallel by connecting the electrode terminals of adjacent single batteries with a bus bar (connection member) (see Patent Literature 1).

In a bus bar module (battery wiring module) in Patent Literature 1, a bus bar is overlaid on a flat plate-shaped terminal for voltage detection, and a wire connected to the terminal for voltage detection is guided to a battery ECU. Thereby, the bus bar module (battery wiring module) detects whether a voltage of a single cell is kept in a predetermined range on the battery ECU side.

RELATED ART

Patent Literature

Patent Literature 1: Japanese Patent Laid-open Publication No. 2010-170884

SUMMARY OF THE INVENTION

Problems to be Solved by the Invention

In this regard, a case may also be conceived where detection of the voltage of the single battery is performed not only at a position of the positive/negative electrode terminals connected by the bus bar, but also at a position other than that of the positive/negative electrode terminals in order to increase accuracy of the battery module, and the like. For example, in addition to the positive/negative electrode terminals, the single battery includes a battery-side detection terminal for detecting intermediate voltage between the electrode terminals, which detect the voltage in this position. In such a case, the battery wiring module holds a wiring module-side detection terminal in a position different from that of the bus bar. In addition, when an opening is provided to a reverse surface of the battery wiring module at a position of the wiring module-side detection terminal and the battery wiring module is mounted on a plurality of single batteries, the battery-side detection terminal of the single batteries advances through the opening and contacts the wiring module-side detection terminal.

In general, a battery wiring module includes a space where wires connected to each detection terminal are routed. However, an advantage herein is that the space for routing the wires can be increased when the wiring module-side detection terminal can be made smaller in size. Herein, when the wiring module-side detection terminal is made smaller in size, the wiring module-side detection terminal provided at a different position than the positive/negative electrode terminals is not placed over the bus bar. Therefore, when the wiring module-side detection terminal is merely made smaller in size, there is an issue that the wiring module-side detection terminal may escape through the opening.

The present invention was achieved in view of the above-noted circumstances and has as an object to provide a battery wiring module in which a wiring module-side detection terminal can be made smaller in size.

Means for Solving the Problems

A battery wiring module according to the present invention is the battery wiring module in which connection members are held by a resin protector, the connection members connecting adjacent electrode terminals of a plurality of single batteries, the single batteries having the positive and negative electrode terminals, as well as a battery-side detection terminal for detecting a status of the single battery. The battery wiring module includes a wiring module-side detection terminal, which includes a flat plate-shaped flat plate and a wire connection connected to a terminal end of a wire. The resin protector includes an opening, which enables the battery-side detection terminal to contact the flat plate of the wiring module-side detection terminal. The wiring module-side detection terminal includes an engaged portion extending on a different plane than that of the flat plate. The engaged portion is engaged with a first engagement portion provided to the resin protector.

According to the present configuration, the wiring module-side detection terminal includes the engaged portion extending on the plane different from that of the flat plate, and the engaged portion is engaged with the first engagement portion, which is provided to the resin protector. Therefore, even when the wiring module-side detection terminal is small, the engaged portion is engaged with the first engagement portion, and thus escape of the wiring module-side detection terminal through the opening can be prevented. Accordingly, the wiring module-side detection terminal of the battery wiring module can be made smaller in size. Moreover, by making the wiring module-side detection terminal smaller in size, wiring space for the wires can be more readily ensured.

In addition to the above configuration, having the following configuration is more preferable, The engaged portion is formed on an engaged tab extending from the flat plate at an angle with respect to a surface of the flat plate.

In this way, a configuration where the wiring module-side detection terminal engages with the first engagement portion can be simplified.

The engaged tab extends from an end portion of the flat plate on a side opposite the wire connection.

For example, when the engaged portion extends from a lateral end portion of the flat plate, the wiring module-side detection terminal is difficult to position unless the engaged portion is provided to both lateral end portions. However, according to the present configuration, the end portion side on the side opposite the wire connection can be engaged by the engaged tab and the wire connection side can be held via the wire. Therefore, the wiring module-side detection terminal is more readily engaged with the first engagement portion with a simple configuration.

The battery-side detection terminal is configured with a conductive body connected to the wiring module-side detection terminal and a resin member surrounding the conductive body. The first engagement portion is provided in a region of the resin member.

In this way, even when the engaged portion does not extend outside the battery-side detection terminal, the engaged portion can be engaged with the first engagement portion. Therefore, the wiring module-side detection terminal can be made even smaller in size.

The first engagement portion is provided so as to fill a gap between the engaged portion and the resin member.

In this way, an extension length of the engaged portion can be made shorter as compared to a case where a space is formed between the engaged portion and the resin member. Thus, the configuration where the engaged portion engages with the first engagement portion can be simplified.

A second engagement portion is provided on a side of the engaged portion opposite the first engagement portion, the second engagement portion engaging the engaged portion with a predetermined clearance from the first engagement portion.

The engaged portion is placed between the first engagement portion and the second engagement portion. Thereby, separation of the wiring module-side detection terminal can be prevented and displacement of the wiring module-side detection terminal within the range of the predetermined clearance is allowed. Thus, an error in dimensional accuracy during assembly can be absorbed.

The second engagement portion engages a forefront end side of the engaged portion more than the first engagement portion.

For example, molding of the first engagement portion and the second engagement portion can be facilitated, and work of engaging the engaged portion with the first engagement portion and the second engagement portion when assembling the wiring module-side detection terminal can be facilitated, as compared to a case where the same position in the extension direction of the engaged portion is engaged from two sides by the first engagement portion and the second engagement portion.

A step is formed between the flat plate and the wire connection, the step having the flat plate sunk into the opening.

In this way, the wiring module-side detection terminal can be positioned using the opening, which is necessarily provided in order to connect the terminals.

Effect of the Invention

According to the present invention, a wiring module-side detection terminal of a battery wiring module can be made smaller in size.

MODE FOR CARRYING OUT THE INVENTION

Embodiment 1

Figure 1:
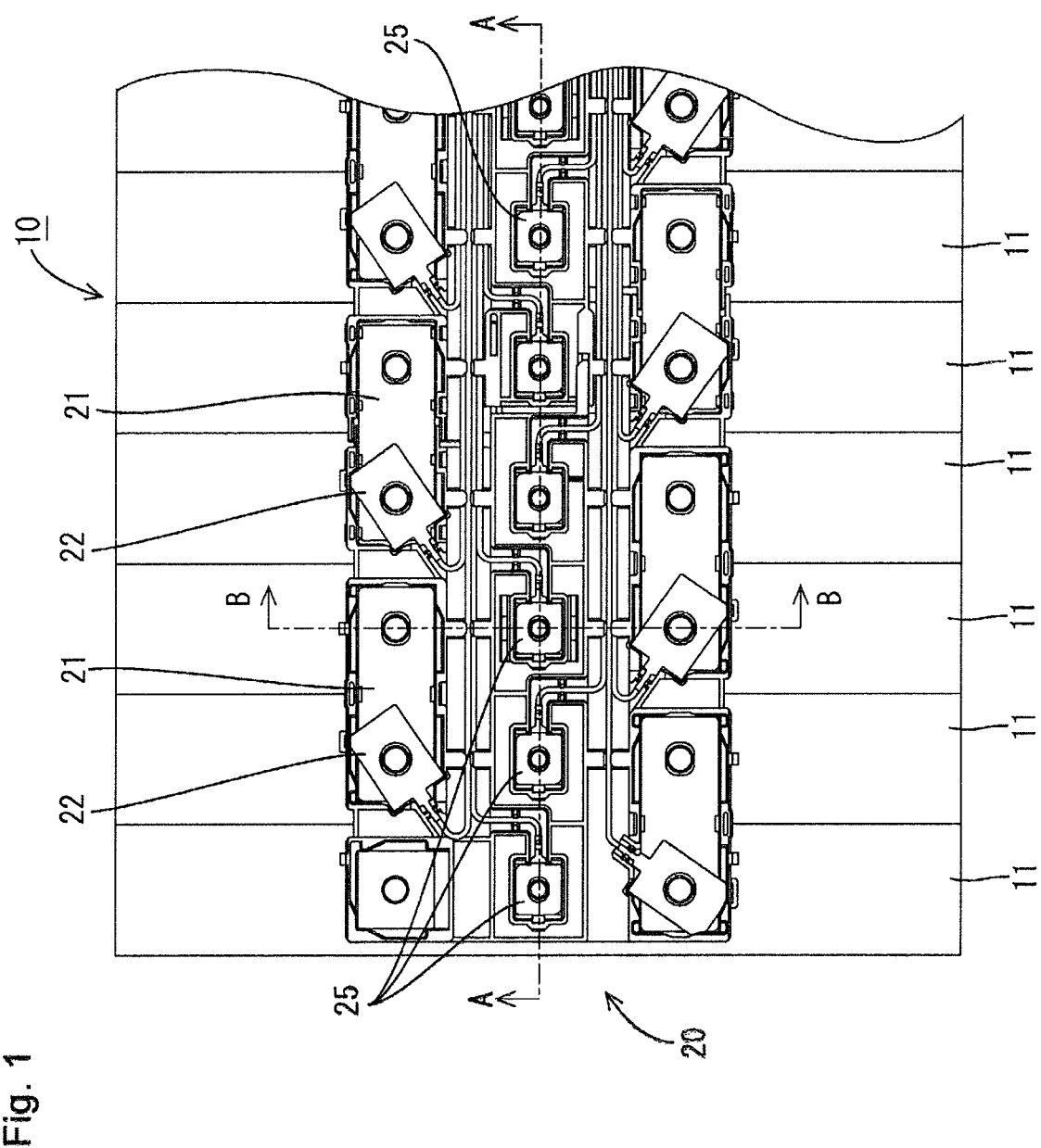
FIG. 1 is a plan view showing a battery module (partially omitted) having a battery wiring module according to Embodiment 1 attached thereto.

Hereafter, an embodiment of the present invention is described with reference to FIGS. 1 to 11. As shown in FIG. 1, a battery wiring module 20 according to the present embodiment configures a battery module 10 by attaching to a bank of single batteries configured by aligning a plurality of single batteries 11. The battery module 10 is used as a drive source in an electric automobile or hybrid automobile, for example. Hereafter, the description is given with downward in FIG. 1 treated as forward and upward treated as rearward for a front-back direction, while a near face of a sheet of FIG. 1 is treated as upward and a far face of the sheet is treated as downward.

Battery Module

Figure 2:
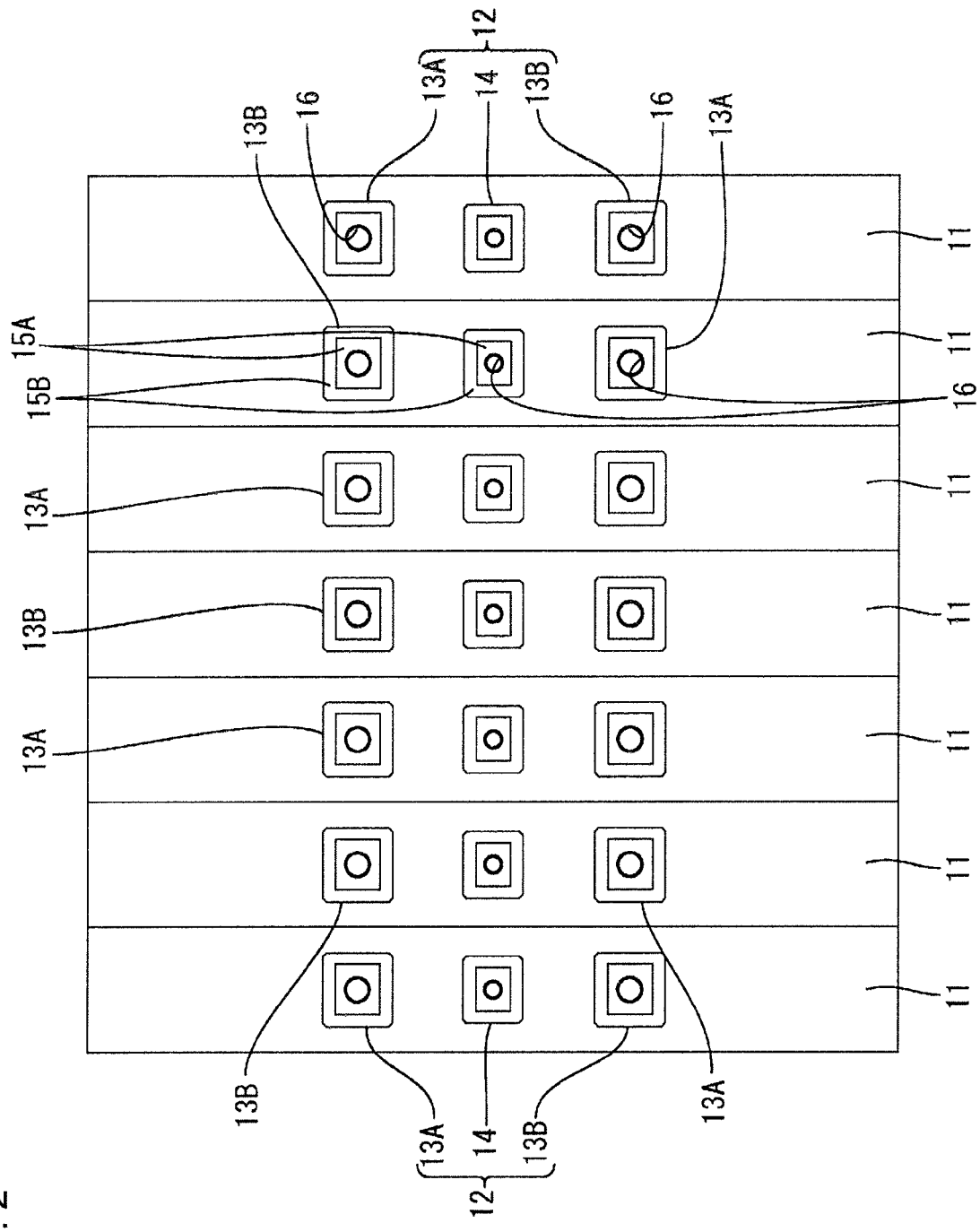
FIG. 2 is a plan view showing a state in which a plurality of single batteries are arranged in a line.

As shown in FIG. 1, the battery module 10 is configured to include a plurality of single batteries 11 arrayed horizontally and the battery wiring module 20 attached to the plurality of single batteries 11. As shown in FIG. 2, the single batteries 11 include terminals 12 projecting perpendicularly from an end surface of a cuboid main body, the main body having a power generating element not shown in the drawings housed in an interior thereof.

The terminals 12 include electrode terminals 13A and 13B (a positive electrode is shown in the drawings as 13A, while a negative electrode is 13B) and a battery-side detection terminal 14 located at a portion intermediate to the electrode terminals 13A and 13B. The electrode terminals 13A and 13B and the battery-side detection terminal 14 are all nut-shaped with a screw hole 16 in a center thereof. All are configured with a conductive body 15A made of metal and a resin member 15B surrounding the conductive body 15A in a circumferential direction. All have the conductive body 15A exposed on a top end (forefront end) thereof, the conductive body 15A projecting upward a predetermined distance from the top end of the resin member 15B (see FIG. 4). A top end surface (forefront end surface) of the conductive body 15A has a flat, rectangular shape. Moreover, the top end surface of the battery-side detection terminal 14 is formed to be much smaller than those of the electrode terminals 13A and 13B.

An orientation of polarities (positive or negative) of each of the single batteries 11 is positioned such that adjacent single batteries 11 have mutually opposite orientations. Thereby, the electrode terminals 13A and 13B are configured so as to have different polarities adjacent to each other. The plurality of single batteries 11 are fixated by a holding plate not shown in the drawings.

Battery Wiring Module

Figure 3:
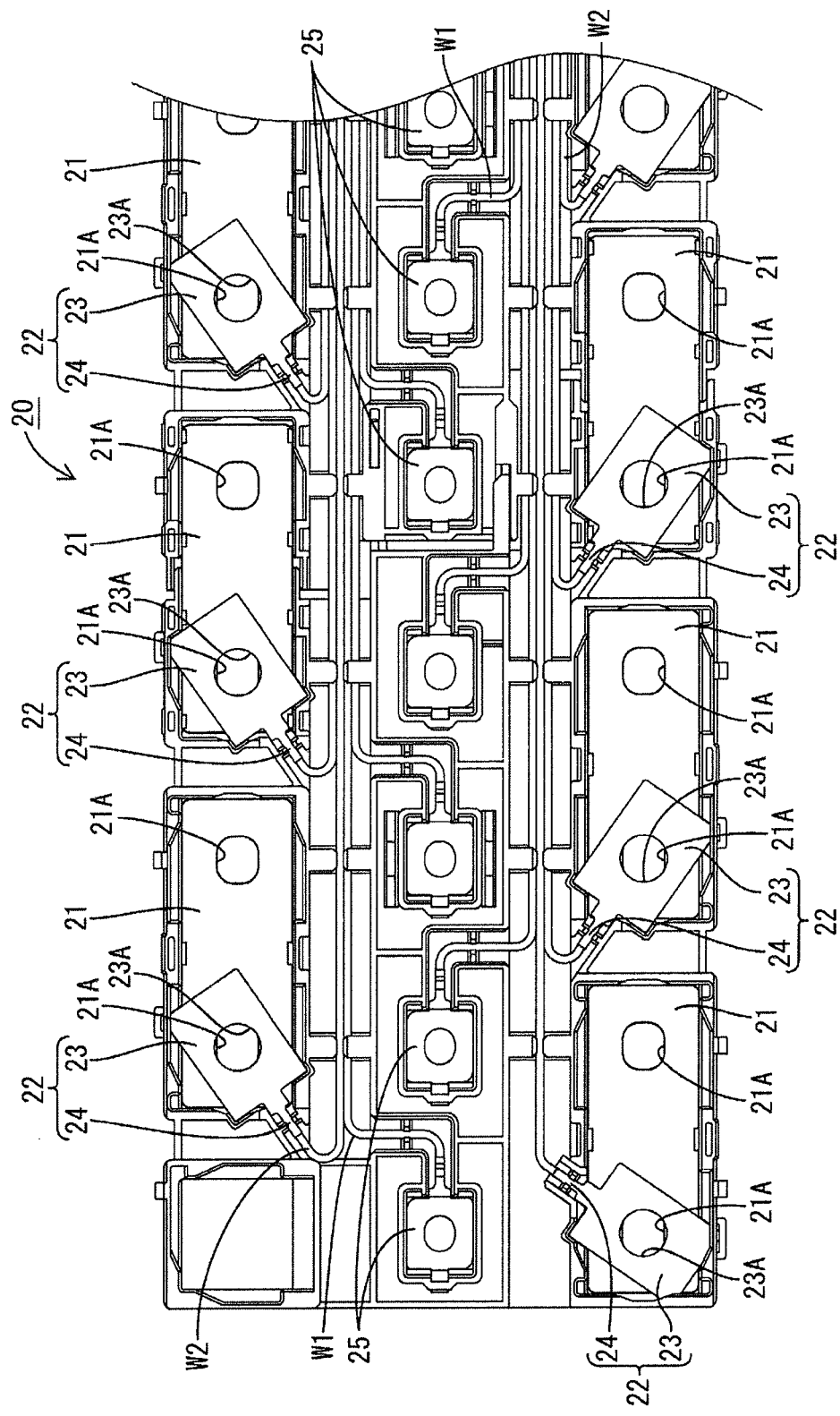
FIG. 3 is a view showing the battery wiring module (partially omitted).

As shown in FIG. 3, the battery wiring module 20 is configured to include a plurality of connection members 21 connecting the left-right adjacent electrode terminals 13A and 13B; a plurality of voltage detection terminals 22 overlaid on each of the connection members 21 and connected to a terminal end of a wire W2 to detect the voltage of the single battery 11; a plurality of voltage detection terminals 25 connected to a terminal end of a wire W1 (an example of a "wiring module-side detection terminal" configuring the present invention); and a resin protector 32 made of a synthetic resin and housing the connection members 21, the voltage detection terminals 22, and the voltage detection terminals 25.

The connection member 21 is configured with a metal such as copper, a copper alloy, aluminum, or the like, and has substantially a rectangular shape. The connection member 21 includes a pair of insertion holes 21A through which a shaft of a bolt (fastening member) is inserted. The insertion holes 21A have an elliptical shape long in the left-right direction. The voltage detection terminal 22 is provided to detect the voltage of the electrode terminals 13A and 13B of the single battery 11. The voltage detection terminal 22 is configured with a rectangular plate-shaped portion 23 and a crimped portion 24 continuous with the plate-shaped portion 23 and crimped to the terminal end of the wire W2. A circular insertion hole 23A runs through a center of the plate-shaped portion 23.

In the crimped portion 24, an exposed conductive body is crimped, the conductive body having an insulating covering (insulating layer) stripped away on the terminal end of the wire W2, which is configured by a covered wire. The voltage detection terminal 22 is positioned with an orientation skewed with respect to a connection direction of the connection member 21.

Voltage Detection Terminal

Figure 7:
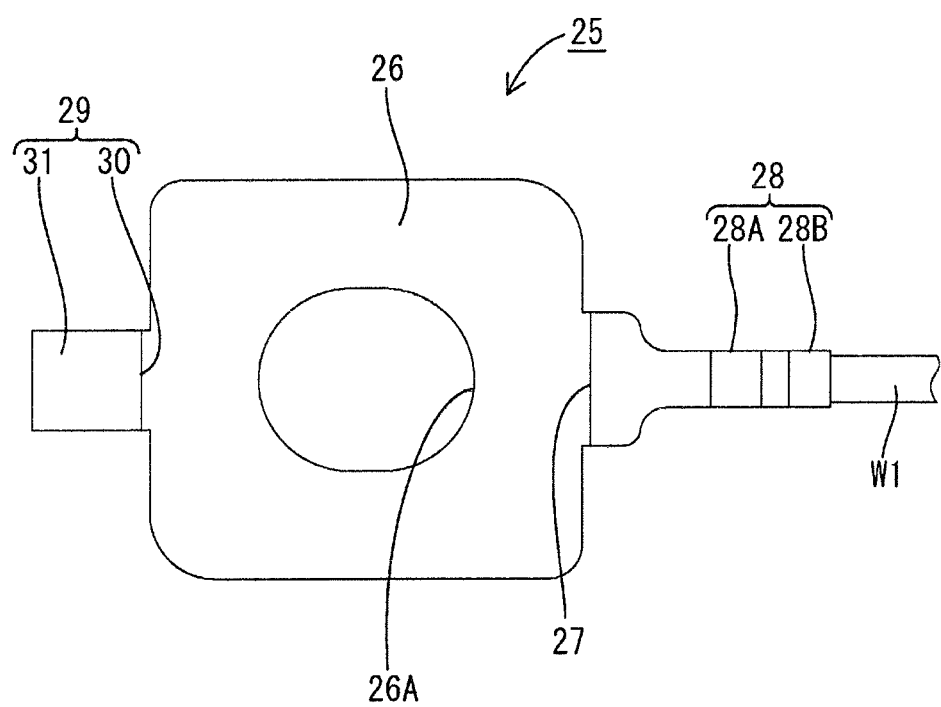
FIG. 7 is a plan view showing the voltage detection terminal.

The voltage detection terminal 25 is for detecting the voltage at an intermediate portion of the single battery 11. As shown in FIG. 7, the voltage detection terminal 25 is configured with a flat plate-shaped flat plate 26; a wire connection 28 continuous with a right end portion of the flat plate 26 (a first end in a wire extension direction) and connected to the terminal end of the wire W1; and an engaged tab 29 continuous with a left end of the flat plate 26 (end on a side different from that of the wire connection 28 in the wire extension direction).

Figure 6:
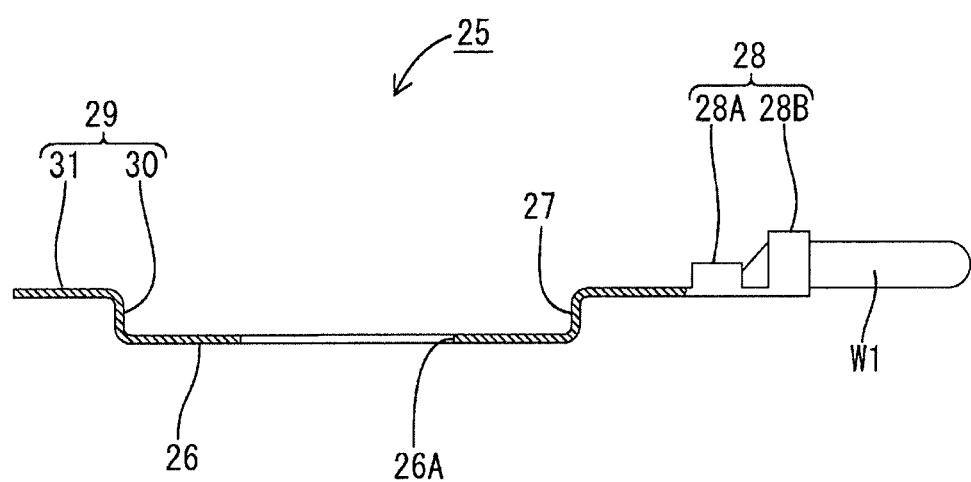
FIG. 6 is a lateral cross-sectional view showing a voltage detection terminal.

The flat plate 26 is a portion placed on the conductive body 15A of the battery-side detection terminal 14 and has a rectangular shape with a surface area smaller than that of the plate-shaped portion 23 of the voltage detection terminal 22. The flat plate 26 has a circular insertion hole 26A running through a center portion thereof, through which the shaft of the bolt can be inserted. As shown in FIG. 6, a step 27 is formed between the flat plate 26 and the wire connection 28. The wire connection 28 is continuous with a right side of the step 27, the wire connection 28 having a height identical to the engaged tab 29.

The wire connection 28 is crimped to the exposed conductive body, the conductive body having the insulating covering thereof stripped away on the terminal end of the wire W1, which is a covered wire. The wire connection 28 includes a wire barrel 28A crimping a conductive portion of the wire W1, and an insulation barrel 28B where the insulating covering of the wire W1 is swaged from above.

The engaged tab 29 has a hook shape and extends to the left with a width constricting a diameter of the flat plate 26 on both sides. More specifically, the engaged tab 29 is configured by a bent portion 30 and an engaged portion 31. The bent portion 30 is bent (extending at a right angle from the flat plate 26) in a direction orthogonal to the flat plate 26 (a direction having an angle of 90 degrees), and the engaged portion 31 is bent from the terminal end of the bent portion 30 in a direction orthogonal to the extension direction of the bent portion 30. Thereby, the engaged portion 31 extends in a direction parallel to (on a different plane than) the flat plate portion 26.

The wires W1 and W2 are both collected in a wire through-portion 50 of the resin protector 32 (described below) and guided to the right (a first direction in an alignment direction of the voltage detection terminal 22 and the voltage detection terminal 25) to a battery ECU not shown in the drawings, the wires W1 and W2 being continuous with the voltage sensing terminal 25 and the voltage detection terminal 22. The battery ECU has a microcomputer, an element, and the like installed therein and has a known configuration that includes functions for detecting the voltage, current, temperature, and the like of the single batteries 11, for controlling power storage and release of each of the single batteries 11, and so on.

Resin Protector

Figure 8:
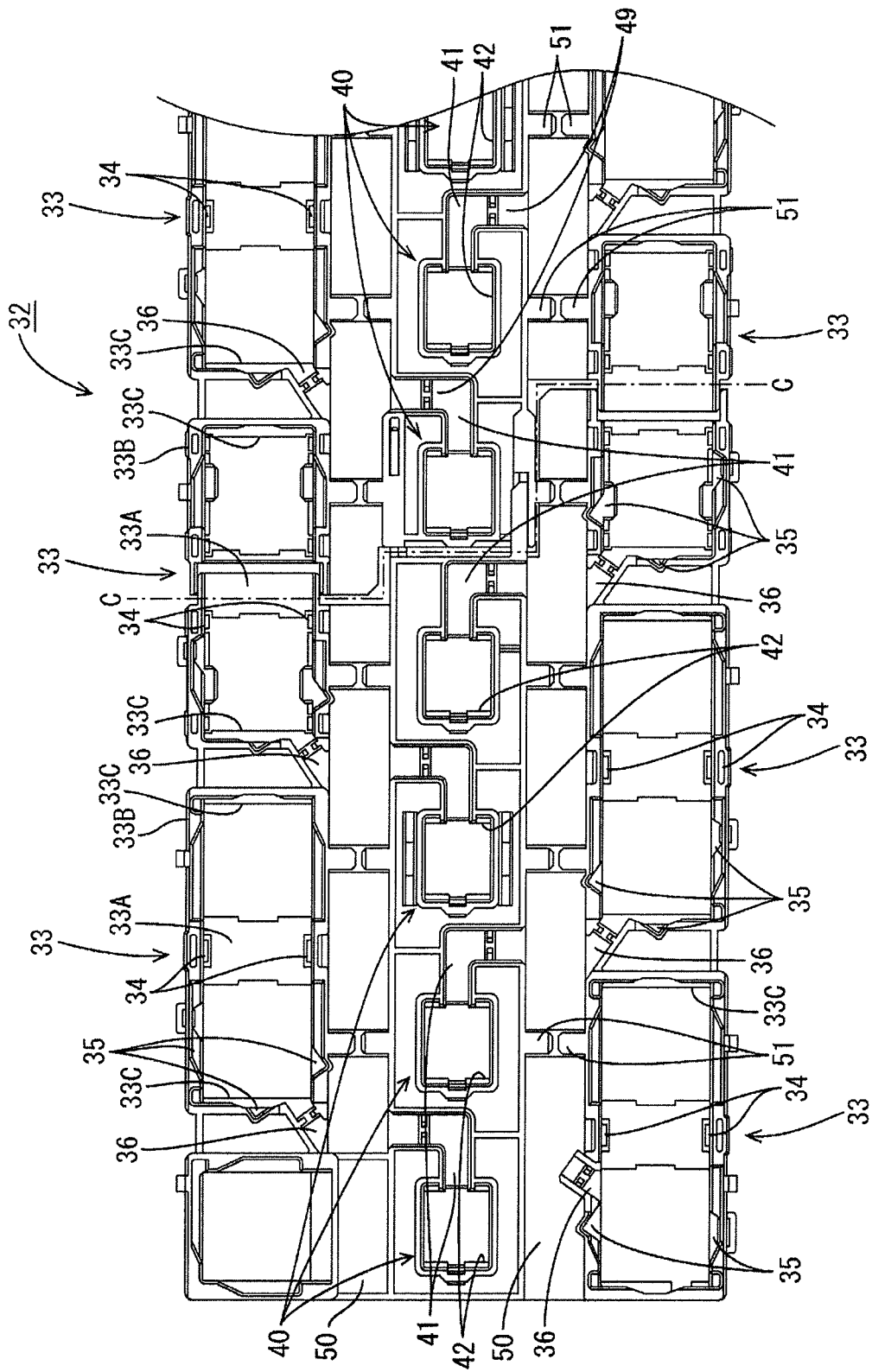
FIG. 8 is a plan view showing a resin protector.

As shown in FIG. 8, the resin protector 32 includes a plurality of connection member holders 33 holding each of the connection members 21; a plurality of detector holders 40 housing the voltage detection terminals 25; and the wire through-portion 50 through which the wires W1 and W2 are passed, the wires W1 and W2 being continuous with the voltage detection terminal 25 and the voltage detection terminal 22.

The plurality of connection member holders 33 are aligned left to right on each of a forward side and a rearward side of the resin protector 32. The connection member holders 33 include a base plate 33A on which the connection member 21 is placed and a dividing wall 33B formed so as to surround the connection member 21. The base plate 33A is connected to the dividing walls 33B at a width-direction intermediate portion. No base plate 33A is formed on two sides of the base plate 33A at the intermediate portion; instead, the two sides form electrode advance holes 33C into which the electrode terminals 13A and 13B can advance. A size of the electrode advance holes 33C is set to a size such that an entire top surface including the conductive body 15A and the resin member 15B of the electrode terminals 13A and 13B can be inserted therein.

In order to prevent a short circuit caused by a tool or the like contacting the electrode terminals 13A and 13B and the connection members 21, the dividing walls 33B rise up in an annular shape around a periphery of the connection members 21 so as to surround the connection members 21 at a height preventing contact with the tool or the like. The dividing wall 33B includes a separation regulating tab 34 capable of flexure deformation in the front-back direction. The connection member 21 is placed below a hook-shaped portion of the separation regulating tab 34, thereby regulating separation of the connection member 21.

In addition, the dividing wall 33B includes a recess 35 and a through-hole (not shown). The recess 35 positions the plate-shaped portion 23 of the voltage detection terminal 22 when a corner of the plate-shaped portion 23 fits into the recess 35 from above. The through-hole is provided running through the dividing wall 33B, another corner of the voltage detection terminal 22 being inserted through the through-hole.

In addition, a through-trench 36 is recessed into a portion on a corner of the dividing wall 33B, the crimped portion of the voltage detection terminal 22 being passed through the through-trench 36. A pair of pinching tabs are formed on the through-trench 36, the pinching tabs pinching the crimped portion of the voltage detection terminal 25 from both sides. The through-trench 36 is provided at a position on the wire through-portion 50 side, and is provided such that the wire W2 joins the wire through-portion 50 from an angled direction.

Detector Holder

Figure 9:
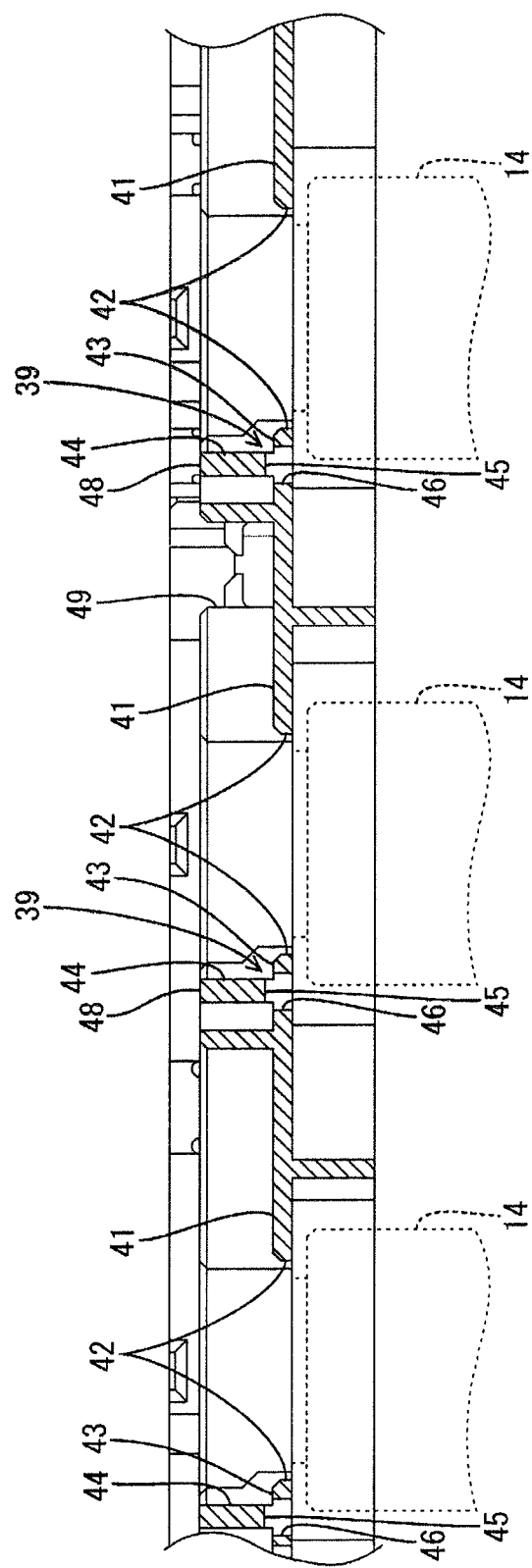
FIG. 9 is a view showing the resin protector before being mounted on the voltage detection terminal of FIG. 4.

A plurality of detector holders 40 are provided aligned left to right at a front-back direction intermediate portion of the resin protector 32. As shown in FIG. 9, each of the detector holders 40 includes a stage 41 on which a wire connection 28-side portion of the voltage detection terminal 25 is placed; an opening 42 where the battery-side detection terminal 14 can contact the flat plate 26 of the voltage detection terminal 25; a first engagement portion 43 engaging the engaged portion 31 of the voltage detection terminal 25 from below; a second engagement portion 45 engaging the engaged portion 31 of the voltage detection terminal 25 from above; and a separation wall 48 separating each of the detector holders 40 from an exterior.

A top surface of the stage 41 has a flat plate shape, and the separation wall 48 rises up from a right end portion of the stage 41. The separation wall 48 is divided to provide a through portion 49 guiding the wire W1 into a forward wire through-portion 50, and a through portion 49 guiding the wire W1 into a rearward wire through-portion 50, the through portions 49 alternating with respect to the left-right aligned detector holders 40.

The opening 42 opens in a rectangular shape corresponding to the shape of the flat plate 26 of the voltage detection terminal 25. A size of the opening 42 is bigger than the top surface of the conductive body 15A of the battery-side detection terminal 14 and smaller than the top surface of an entirety that includes the resin member 15B of the battery-side detection terminal 14. In addition, the opening 42 is smaller than the electrode advance hole 33C of the connection member holder 33. The first engagement portion 43 is positioned above the resin portion 15B (in the area of the resin portion 15B), the first engagement portion 43 being continuous with an aperture edge on the left end of the opening 42. The aperture edge on the right end of the opening 42 is continuous with the stage 41. Moreover, a top end edge of the opening has tapered corners.

The first engagement portion 43 has the same height as the stage 41, and a vertical-direction thickness substantially equals a vertical-direction dimension (extension length) of the bent portion 30 of the engaged tab 29. An upper side of the first engagement portion 43 has a first excavated portion 44 where the separation wall 48 is cut away to have a thin wall and open upward. The first excavated portion 44 is formed by upward punching of the die during molding.

The second engagement portion 45 is provided to the left of the first engagement portion 43 (forward in the insertion direction of the engaged portion 31), and is formed by notching a lower side of the separation wall 48 such that a bottom end of the second engagement portion 45 has a dimension in which a predetermined clearance CL is added to the thickness of the engaged portion 31 from the top end of the first engagement portion 43. The lower side of the second engagement portion 45 has a second excavated portion 46 where a lower portion of the separation wall 48 is cut away. The second excavated portion 46 is formed by downward punching of the die during molding.

Figure 10:
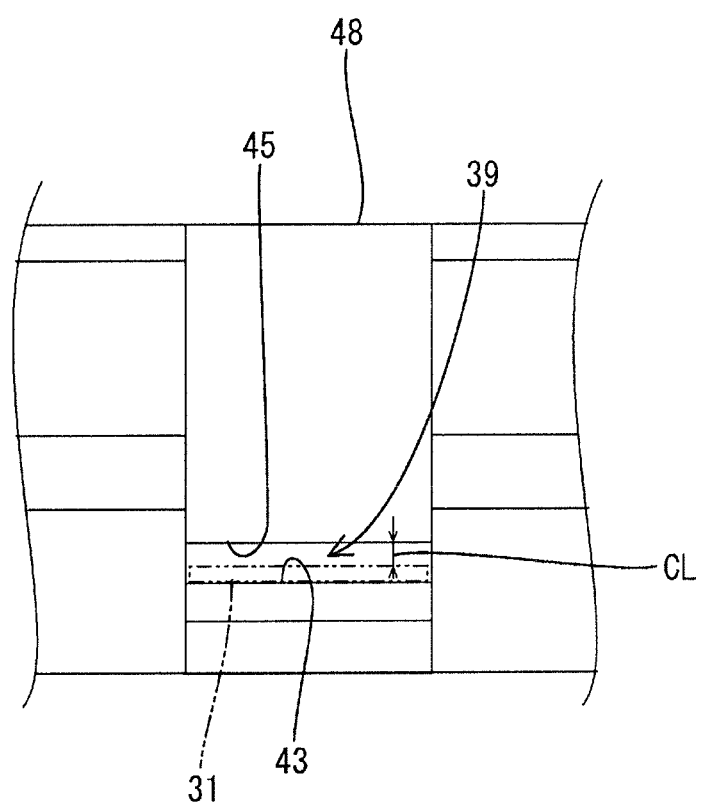
FIG. 10 is a view showing, from an interior of a detector holder, a portion proximate to a first engagement portion and a second engagement portion of the resin protector.

In addition, at the time of mounting the voltage detection terminal 25, the engaged portion 31 of the engaged tab 29 of the voltage detection terminal 25 is passed through an insertion hole 39 formed between the first engagement portion 43 and the second engagement portion 45. When the voltage detection terminal 25 is mounted on the detector holder 40, before attaching the battery wiring module 20 to the single batteries 11, the engaged portion 31 is placed (catches) on the first engagement portion 43, and the flat plate 26 enters a state of being sunk within the opening 42 while a bottom surface of the wire connection 28 is placed on the stage 41. At this point, as shown in FIG. 10, the second engagement portion 45 is provided above where the predetermined clearance CL exists with the thickness of the engaged portion 31, above the first engagement portion 43.

Figure 4:
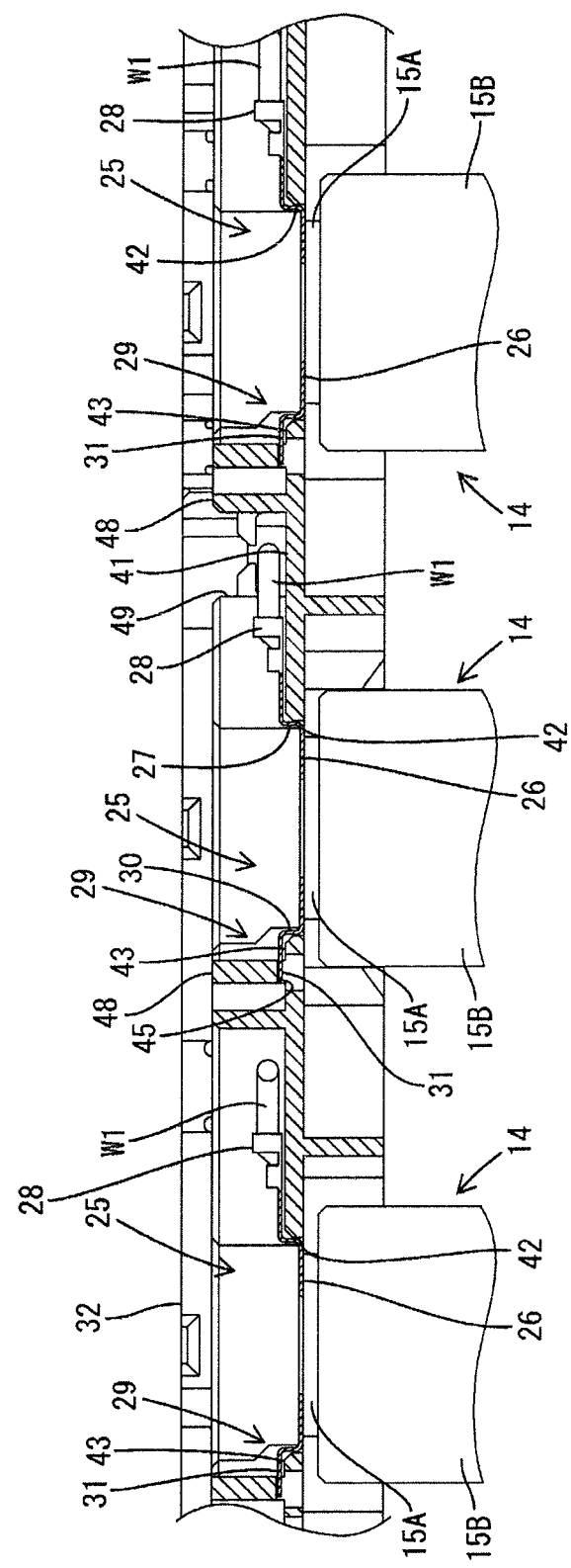
FIG. 4 is a view along a cross-section A-A in FIG. 1 (partially omitted).
Figure 5:
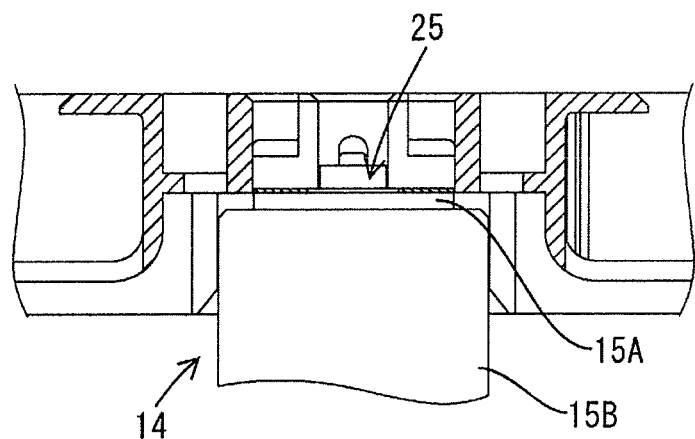
FIG. 5 is a view along a cross-section B-B in FIG. 1 (partially omitted).

Meanwhile, as shown in FIG. 4, when the battery wiring module 20 is attached to the single batteries 11, the flat plate 26 abuts the conductive body 15A of the battery-side detection terminal 14, lifting up the voltage detection terminal 25, then the engaged portion 31 rises up (separates) from the first engagement portion 43 in a range of the clearance CL, and abuts the second engagement portion 45, engaging therewith. The flat plate 26 is lifted up enough to be on a single plane with the bottom end (bottom surface) of the first engagement portion 43 and the stage 41. The wire connection 28 side is in a state raised off of the stage 41. Moreover, even in this state (a mostly lifted state), the flat plate 26 is in a state sunk into the opening 42.

As shown in FIG. 8, the wire through-portion 50 is provided in a trench shape (rows) both between the forward plurality of connection member holders 33 and the plurality of detector holders 40, and between the plurality of detector holders 40 and the rearward connection member holders 33. On a top portion of the wire through-portion 50, a pair of hooks 51 are provided opposite each other, the hooks 51 being used for holding the wires W1 and W2 within the wire through-portion 50.

Moreover, the resin protector 32 is configured from a plurality of connection units (see a boundary of the connection units at C-C in FIG. 8), and each of the connection units is connected by the connection members 21. When the plurality of connection units are connected left to right, the wire through-portions 50 of adjacent connection units become continuous.

Next, assembly of the battery wiring module 20 is described. The resin protector 32 is formed by the plurality of connection units linked left to right (FIG. 8). Next, the connection members 21 are held by the connection member holders 33, and in addition the voltage detection terminal 22 is mounted overlapped on the connection members 21, the voltage detection terminal 22 being connected to the terminal end of the wire W2.

Next, the engaged portion 31 of the voltage detection terminal 25 is passed through the insertion hole 39 between the first engagement portion 43 and the second engagement portion 45 of the detector holder 40 while the wire connection 28 is placed on the stage 41. Thereby, the engaged portion 31 is in a state held by the detector holder 40 in a state supported from below by the first engagement member 43 (FIG. 10). When the mounting of all the voltage detection terminals 25 is finished, the battery wiring module 20 is formed (FIG. 3).

Next, the battery wiring module 20 is attached to the plurality of single batteries 11. When the battery wiring module 20 is attached such that the battery-side detection terminals 14 of the plurality of single batteries 11 advance into the openings 42, a state is entered where the flat plate 26 abutting the conductive body 15A of the battery-side detection terminal 14 is pushed up and the engaged portion 31 is engaged from above by the second engagement portion 45. The battery module 10 is then formed by passing the shaft of the bolt through the insertion holes 21A, 23A, and 26A of the connection members 21, voltage detection terminals 22, and voltage detection terminals 25 (FIG. 1).

The present embodiment achieves the following advantageous effects.

(1) The battery wiring module 20 in which the connection members 21 are held by the resin protector 32, the connection members 21 connecting adjacent electrode terminals 13A and 13B of the plurality of single batteries 11, the single batteries 11 having the positive and negative electrode terminals 13A and 13B, as well as the battery-side detection terminal 14 for detecting a status of the single battery 11. The battery wiring module 20 includes the voltage detection terminal 25 (wiring module-side detection terminal), which includes the flat plate-shaped flat plate 26 and the wire connection 28 connected to the terminal end of the wire W1. The resin protector 32 includes the opening 42, which enables the battery-side detection terminal 14 to contact the flat plate 26 of the voltage detection terminal 25. The voltage detection terminal 25 includes the engaged portion 31 extending on a different plane than that of the flat plate 26. The engaged portion 31 is engaged with the first engagement portion 43 provided to the resin protector 32.

According to the present embodiment, the voltage detection terminal 25 (wiring module-side detection terminal) includes the engaged portion 31 extending on the different plane than that of the flat plate 26, and the engaged portion 31 is engaged with the first engagement portion 43, which is provided to the resin protector 32. Therefore, even when the voltage detection terminal 25 is small, the engaged portion 31 is engaged with the first engagement portion 43, and thus escape of the voltage detection terminal 25 from the opening 42 can be prevented. Accordingly, the voltage detection terminal 25 of the battery wiring module 20 can be made smaller in size. Moreover, by making the voltage detection terminal 25 smaller in size, wiring space for the wires can be more readily ensured.

Figure 11:
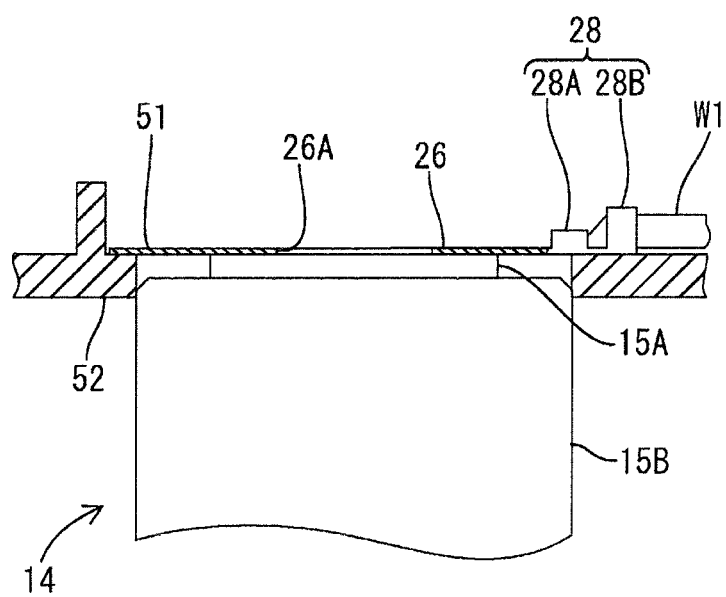
FIG. 11 is a lateral cross-sectional view showing, as a comparative example, a case where a left side of a flat plate of the voltage detection terminal is flat.

In addition, as shown in FIG. 11, for example, when an engaged portion 51 extending on the same plane as the flat plate 26 is included, a first engagement portion 52 engaging the engaged portion 51 is difficult to provide in a gap between the resin member 15B and the flat plate 26 in a lateral direction of the conductive body 15A due to the narrowness of the gap. Therefore, a configuration engaging the voltage detection terminal 25 is likely to increase in size because the first engagement portion 52 must be provided to an outer side of (the resin member 15B of) the battery-side detection terminal 14. Meanwhile, according to the configuration of the present embodiment, the engaged portion 31 extends on the plane different from that of the flat plate 26. Therefore, the first engagement portion 43 can be more readily provided within a region of (the resin member 15B of) the battery-side detection terminal 14 and the voltage detection terminal 25 can be made smaller in size.

(2) The engaged portion 31 is formed on the engaged tab 29 extending from the flat plate 26 at an angle with respect to the surface of the flat plate 26. Therefore, a configuration in which the voltage detection terminal 25 is engaged with the first engagement portion 43 can be simplified.

(3) The engaged tab 29 extends from an end portion of the flat plate 26 on a side opposite the wire connection 28. For example, when the engaged portion 31 extends from the lateral end portion of the flat plate 26, the voltage detection terminal 25 is difficult to position unless the engaged portion 31 is provided to both lateral end portions. However, according to the present embodiment, the end portion side on the side opposite the wire connection 28 can be engaged by the engaged tab 29 and the wire connection 28 side can be held via the wire W1. Therefore, the voltage detection terminal 25 is more readily engaged with the first engagement portion 43 with a simple configuration.

(4) The battery-side detection terminal 14 is configured with the conductive body 15A connected to the voltage detection terminal 25 and the resin member 15B surrounding the conductive body 15A. The first engagement portion 43 is provided in a region of the resin member 15B. In this way, even when the engaged portion 31 does not extend outside the battery-side detection terminal 14, the engaged portion 31 can be engaged with the first engagement portion 43. Therefore, the voltage detection terminal 25 can be made even smaller in size.

(5) The first engagement portion 43 is provided so as to fill a gap between the engaged portion 31 and the resin member 15B. Therefore, an extension length of the engaged tab 29 can be made shorter as compared to a case where a space is formed between the engaged portion 31 and the resin member 15B. Thus, the configuration where the engaged portion 31 engages with the first engagement portion 43 can be simplified.

(6) The second engagement portion 45 is provided on a side of the engaged portion 31 opposite the first engagement portion 43, the second engagement portion 45 engaging (able to engage) the engaged portion 31 with a predetermined clearance CL from the first engagement portion 43. The engaged portion 31 is placed between the first engagement portion 43 and the second engagement portion 45. Thereby, separation of the voltage detection terminal 25 can be prevented and displacement of the voltage detection terminal 25 within the range of the predetermined clearance CL is allowed. Thus, an error in dimensional accuracy during assembly can be absorbed.

(7) The second engagement portion 45 engages the forefront end side of the engaged portion 31 more than the first engagement portion 43. For example, molding of the first engagement portion 43 and the second engagement portion 45 can be facilitated, and work of engaging the engaged portion 31 with the first engagement portion 43 and the second engagement portion 45 when assembling the voltage detection terminal 25 can be facilitated, as compared to a case where the same position in the extension direction of the engaged portion 31 is engaged from two sides by the first engagement portion 43 and the second engagement portion 45.

(8) The step 27 is formed between the flat plate 26 and the wire connection 28, the step 27 having the flat plate 26 sunk into the opening 42. Therefore, the voltage detection terminal 25 can be positioned using the opening 42, which is necessarily provided in order to connect the terminals.

Embodiment 2

Figure 12:
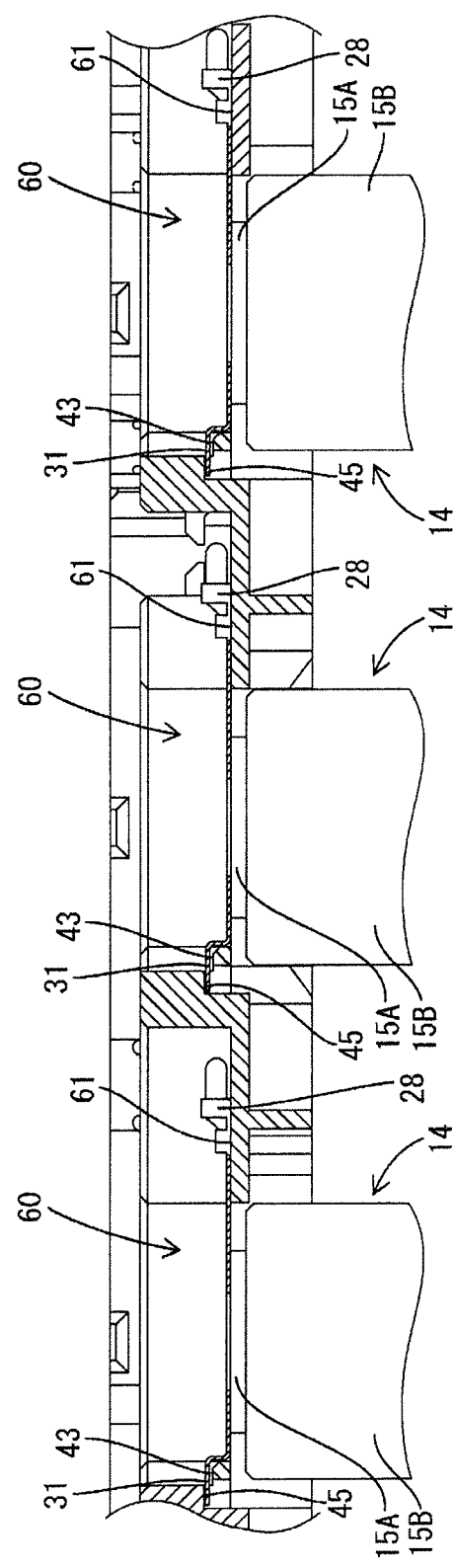
FIG. 12 is a cross-sectional view showing a battery wiring module according to Embodiment 2.
Figure 13:
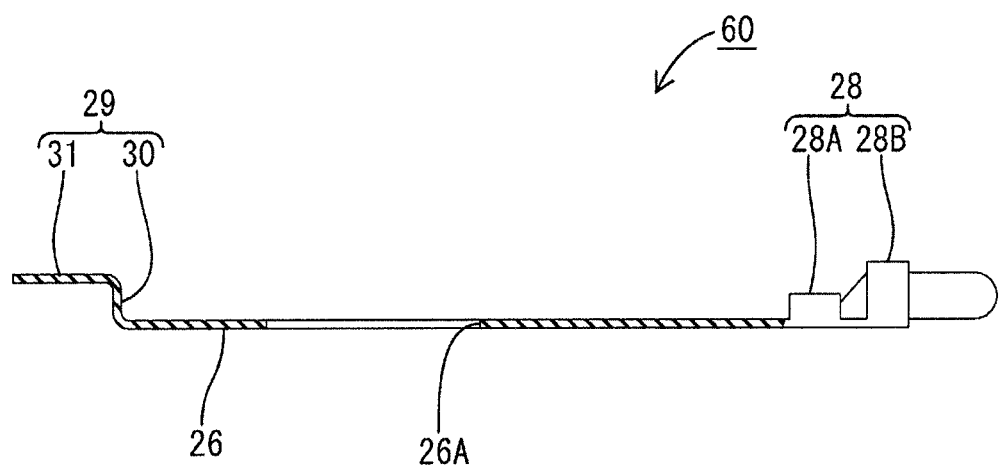
FIG. 13 is a lateral cross-sectional view showing a voltage detection terminal.

Embodiment 2 is described with reference to FIGS. 12 and 13. As shown in FIG. 13, the battery wiring module 20 of Embodiment 2 differs from the voltage detection terminal 25 of Embodiment 1 in that it is a voltage detection terminal 60 lacking the step 27 on the right end of the flat plate 26.

Hereafter, configurations identical to those of Embodiment 1 are given identical reference numerals and descriptions thereof are omitted.

The voltage detection terminal 60 is formed on the same plane as (the bottom surface of) the flat plate 26 and (the bottom surface of) the wire connection 28. Thereby, as shown in FIG. 12, a stage 61 where the wire connection 28 is placed is formed outside (the resin member 15B of) the battery-side detection terminal 14, and a height thereof is formed to a position lower than the stage 41 of Embodiment 1.

Other Embodiments

The present invention is not limited to the embodiment according to the above description and the drawings; instead, the technical scope of the present invention also includes, for example, the following embodiments.

(1) In the above-described embodiments, the engaged tab 29 extended from the left end portion of the flat plate 26 (an end portion on the side opposite that of the wire connection 28). However, the embodiments are not limited to this. For example, an engaged tab may also be provided to front and back ends (lateral end portions in the wire extension direction) of the flat plate 26, and a first engagement portion and second engagement portion may be provided to corresponding locations on the resin protector 32 to engage with the voltage detection terminal.

(2) The above-described embodiments had a configuration in which the bent portion 30 is provided to the engaged tab 29, the bent portion 30 bending in a direction orthogonal to a surface of the flat plate 26. However, the embodiments are not limited to this. For example, a bent portion may be provided extending at a predetermined angle other than a right angle with respect to a surface of the flat plate 26. In addition, the bent portion 30 is not limited to bending from the flat plate 26 and may instead be a bent portion curving from the flat plate 26 and extending on a plane different from that of the flat plate 26.

(3) The above-described embodiments had a configuration in which the connection members 21 connect (serially connect) the electrode terminals 13A and 13B of different polarities. However, the embodiments are not limited to this. The electrode terminals 13A and 13B of the same polarity may also be connected (parallel connection). For example, still another different single battery 11 may have a parallel connection with the battery module 10 of the present embodiment, and the electrode terminals 13A (13B) having the same polarity in the parallel connection may be connected by the plurality of connection members 21.

(4) The number of single batteries 11 configuring the battery module 10 is not limited to the number given in the above-described embodiment. A shape of the battery wiring module 20 can also be changed as appropriate according to the number of the single batteries 11.

(5) In the above embodiments, the battery wiring module 20 was configured by connecting a plurality of separate connection units. However, the embodiments are not limited to this. For example, a battery wiring module may also be configured by a single (integrated-type) connection plate, and the voltage detection terminal 25 may be held by the detector holders 40 provided to the connection plate.

(6) The above-described embodiments are configured to include the voltage detection terminal 25 detecting the voltage of the single battery 11. However, the embodiments are not limited to this. For example, instead of the voltage detection terminal 25, a wiring module-side detection terminal may be provided that detects a status of the single battery 11 other than the voltage, such as the electric current.

DESCRIPTION OF REFERENCE NUMERALS

10 Battery module
11 Single battery
12 Terminal
13A, 13B Electrode terminal
14 Battery-side detection terminal
15A Conductive body
15B Resin member
20 Battery wiring module
21 Connection member
21A Insertion hole
22 Voltage detection terminal
23 Plate-shaped portion
24 Crimped portion
25, 60 Voltage detection terminal (wiring module-side detection terminal)
26 Flat plate
26A Insertion hole
27 Step
28 Wire connection
29 Engaged tab
30 Bent portion
31 Engaged portion
32 Resin protector
40 Detector holder
41, 61 Stage
42 Opening
43 First engagement portion
44 First excavated portion
45 Second engagement portion
46 Second excavated portion
48 Separation wall
50 Wire through-portion
CL Clearance
W1, W2 Wire

The invention claimed is:

1. A battery wiring module attached to a plurality of single batteries, the single batteries each having positive and negative electrode terminals and a battery-side detection terminal for detecting a status of the single battery, the battery wiring module comprising:
a connection member connecting adjacent electrode terminals of the plurality of single batteries,
a wiring module-side detection terminal having a flat plate and a wire connection connected to a terminal end of a wire, the flat plate on top of and adapted to be directly connected to a conductive body of the battery-side detection terminal,
a resin protector that holds the connection member and the wiring module-side detection terminal, the resin protector includes an opening configured to enable the battery-side detection terminal to contact the flat plate of the wiring module-side detection terminal, wherein
the wiring module-side detection terminal includes an engaged portion extending in a plane different from a plane of the flat plate, the engaged portion defining a distalmost end of the wiring module-side detection terminal and being engaged with a first engagement portion of the resin protector.

2. The battery wiring module according to claim 1, wherein the engaged portion is on an engaged tab extending from the flat plate at an angle with respect to a surface of the flat plate.

3. The battery wiring module according to claim 2, wherein the engaged tab extends from an end portion of the flat plate on a side opposite the wire connection.

4. The battery wiring module according to claim 1, wherein the battery-side detection terminal includes a conductive body connected to the wiring module-side detection terminal and a resin member surrounding the conductive body, and the first engagement portion is provided in a region of the resin member.

5. The battery wiring module according to claim 4, wherein the first engagement portion is configured to fill a gap between the engaged portion and the resin member.

6. The battery wiring module according to claim 1, wherein a second engagement portion is provided on a side of the engaged portion opposite the first engagement portion, the second engagement portion engaging the engaged portion with a predetermined clearance from the first engagement portion.

7. The battery wiring module according to claim 6, wherein the second engagement portion engages a forefront end side of the engaged portion more than the first engagement portion.

8. The battery wiring module according to claim 1, wherein a step is formed between the flat plate and the wire connection, the step allowing the flat plate to enter into the opening.

9. The battery wiring module according to claim 1, wherein the connection member is accommodated within a first region of the resin protector and the wiring module-side detection terminal is accommodated within a second region of the resin protector, the second region of the resin protector being provided with the opening that is configured to enable the battery-side detection terminal to contact the flat plate of the wiring module-side detection terminal.

10. The battery wiring module according to claim 9, further comprising a voltage detection terminal overlaid on the connection member within the first region of the resin protector.

* * * * *